W. H. JONES & J. A. STUART.
TIRE-SHRINKER.

No. 176,006.  Patented April 11, 1876.

ATTEST:
Robt Burns
Chas J Gooch

INVENTORS
William A. Jones
John A. Stuart
by Knight
Attorneys

UNITED STATES PATENT OFFICE.

WILLIAM H. JONES AND JOHN A. STUART, OF EXCELLO, MISSOURI.

IMPROVEMENT IN TIRE-SHRINKERS.

Specification forming part of Letters Patent No. 176,006, dated April 11, 1876; application filed March 4, 1876.

*To all whom it may concern:*

Be it known that we, WILLIAM H. JONES and JOHN A. STUART, of Excello, Macon county, State of Missouri, have invented a new and useful Improvement in Tire-Shrinkers, which improvement is fully set forth in the following specification, reference being had to the accompaning drawings.

Our improvement consists in a fixed and a movable jaw, in which the tire is held, and between which it is shrunk or shortened by an inward motion of the movable jaw, such movement being imparted by a system of levers. Between the jaws is a block, on which is placed the heated part of the tire. The whole is arranged for attachment to a common anvil by a pin, which passes through the hardy-hole of the anvil, and a chain at the end, distant from the hand-lever, that engages on a stud of the anvil-block.

Figure 1:
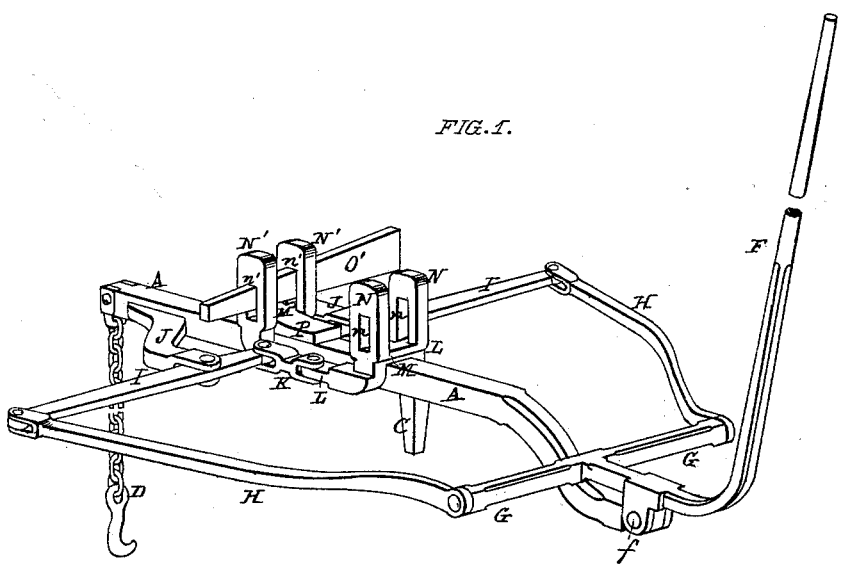
Figure 2:
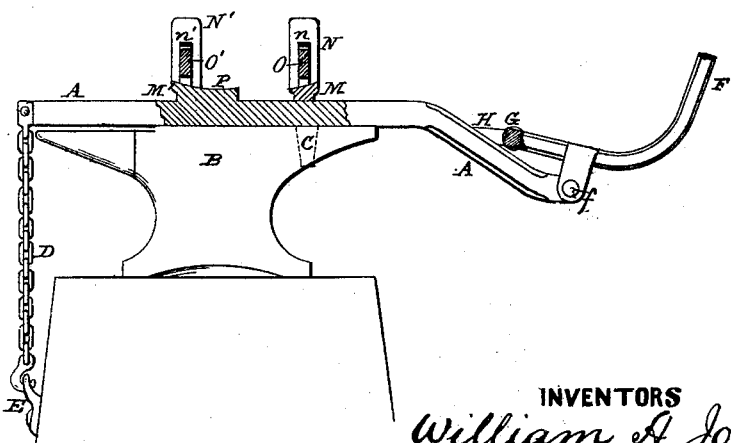

Figure 1 is a perspective view. Fig. 2 is a longitudinal section.

A is the main bar or stock of the machine, which, when in use, lies upon the top of the anvil B, and is held in place by the steady-pin C and anchor-chain D. The steady-pin rests in the ordinary hardy or tool hole of the anvil, and the chain engages on a stud, E, projecting from the side of the anvil-block. F is the hand-lever, fulcrumed at *f* to the end of the stock A, opposite to the chain D. The lever F carries at its shorter end a cross-bar, G, to whose ends are pivoted connecting-rods H H, whose other ends are hinged to the outer ends of levers I I. These levers I I are fulcrumed at the ends of brackets J J, extending from the sides of the stock A. The inner ends of the levers I I are connected to the arms L of the sliding jaw by links K K. The sliding jaw consists of the base M, which works longitudinally on the top of the stock, and two uprights, N N, having vertical slots *n n*, through which passes a wedge, O, by which the tire is clamped to the jaw, the tire being held between the base M and the wedge O. The fixed jaw has parts M′ N′ N′ *n′ n′* and wedge O′, similar to the sliding jaw. Upon the top of the stock A, between the jaws, is a block, P, rounded to suit the outer curvature of the tire which lies upon it.

The operation is as follows: The machine being fixed upon the anvil, a part of the tire is made red-hot, and it is then laid upon the jaws, with the heated part between them. The wedges O O′ are then driven in, and the lever F forced downward, which carries the moving jaw toward the fixed one, and shortens that part of the tire.

We claim—

1. The combination of stock A, fixed jaw M′ N′, and moving jaw M N with clamping-wedges O O′ and system of operating-levers, substantially as set forth.

2. In combination with the jaws M N M′ N′ and actuating-levers F I I, the stock A, with steady-pin C, for engagement to the anvil, substantially as set forth.

WILLIAM H. JONES.
JOHN A. STUART.

Witnesses:
W. D. McCORMICK,
J. W. BROGANE.